United States Patent [19]
Tomita et al.

[11] Patent Number: 5,082,434
[45] Date of Patent: Jan. 21, 1992

[54] TIRE VULCANIZING MACHINE

[75] Inventors: Atsushi Tomita; Katsuyoshi Sakaguchi, both of Nagasaki, Japan

[73] Assignee: Mitsubishi Jukogyo Kabushiki Kaisha, Tokyo, Japan

[21] Appl. No.: 561,908

[22] Filed: Jul. 31, 1990

[30] Foreign Application Priority Data

Aug. 10, 1989 [JP] Japan .................. 1-205587
Feb. 2, 1990 [JP] Japan .................. 2-22109

[51] Int. Cl.$^5$ .............................. B29C 35/02
[52] U.S. Cl. .................... 425/28.1; 425/40;
425/47; 425/50; 425/450.1
[58] Field of Search ............ 425/28.1, 29, 34.1,
425/40, 47, 50, 450.1, 451.9, 35

[56] References Cited

U.S. PATENT DOCUMENTS

| | | | |
|---|---|---|---|
| 2,812,547 | 11/1957 | Duerksen et al. | 425/47 |
| 3,109,197 | 11/1963 | Sunday | 425/47 |
| 3,829,271 | 8/1974 | Taylor | 425/47 |
| 3,918,861 | 11/1975 | Klose | 425/47 |
| 3,947,540 | 3/1976 | Hashimoto et al. | 425/47 |
| 4,332,536 | 6/1982 | Singh et al. | 425/47 |
| 4,390,334 | 6/1983 | Singh et al. | 425/47 |
| 4,484,874 | 11/1984 | Okawachi | 425/34.1 |
| 4,580,959 | 4/1986 | Pissorno et al. | 425/28.1 |
| 4,813,861 | 3/1989 | Hasegawa et al. | 425/28.1 |

FOREIGN PATENT DOCUMENTS 0173915 8/1965 U.S.S.R. .................. 425/34.1

*Primary Examiner*—Willard Hoag
*Attorney, Agent, or Firm*—Wenderoth, Lind & Ponack

[57] ABSTRACT

The known tire vulcanizing machine of the type in which upper and lower bolsters are disposed within a frame, upper and lower metal molds are respectively fixedly secured to the upper and lower bolsters, and a press mechanism for bringing the upper and lower metal molds into tight contact with each other under a pressure is disposed between the frame and either one of the bolsters, is improved so that a green tire loaded in the machine can be visually inspected up until just before the upper and lower metal molds come into tight contact with each other. In one preferred embodiment, a vertically movable pressure-receiving plate having a polygonal shape is rotatable between short-sized position in which it can vertically pass through a space between upper beams and a long-sized position in which it cannot vertically pass through the same. A rotary drive is provided for rotating the pressure-receiving plate about its center. In another preferred embodiment, a cylindrical body is provided on the upper bolster, an adjust screw is threadedly engaged with the cylindrical body, and a pressure-receiving plate having a polygonal shape is coupled to the adjust screw via guide rods. In both embodiments, a clearance between the pressure-receiving plate and the upper beams is made adjustable.

3 Claims, 7 Drawing Sheets

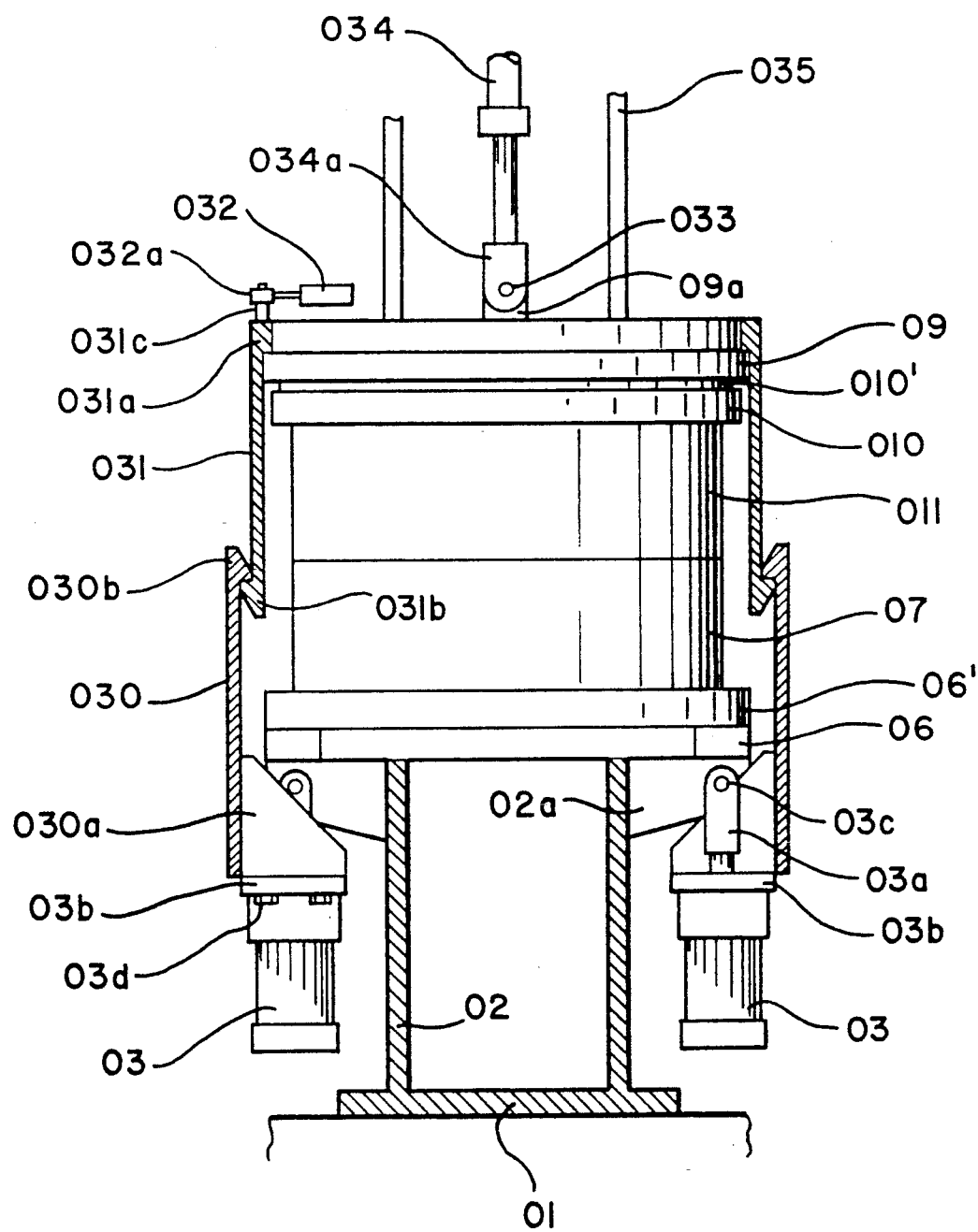

TIRE VULCANIZING MACHINE

BACKGROUND OF THE INVENTION

1. Field of the Invention

The present invention relates to a vulcanizing machine, and more particularly to an improved tire vulcanizing machine for facilitating the loading a green tire into the tire vulcanizing machine.

2. Description of the Prior Art

At first, a tire vulcanizing machine in the prior art will be described with reference to FIG. 8. In this figure, reference numeral 01 designates a base, numeral 02 designates a frame provided on the base 01, numeral 02a designates a plurality of metal brackets projecting outwardly from an upper portion of the frame 02, numeral 03 designates a plurality of hydraulic cylinders (pressing means), numeral 03a designates clevises mounted to the top portions of the piston rods of the respective hydraulic cylinders, numeral 03c designates pins for pivotably supporting the clevises 03a on the aforementioned ear metals 02a, numeral 030 designates a lower ring, numeral 030a designates ribs projecting inwardly from the bottom portion of the lower ring 030, numeral 030b designates claws provided on the inner surface of the top portion of the lower ring 030, numeral 03d designates bolts for fixedly securing flanges 03b of the above-mentioned hydraulic cylinders 03 to the ribs 030a of the aforementioned lower ring 030, numeral 06' designates a lower heat insulator plate fixedly secured to the upper surface of the above-mentioned frame 02, numeral 06 designates a lower heater plate fixedly secured to the upper surface of the lower heat insulator plate 06', numeral 07 designates a lower mold fixedly secured to the upper surface of the lower heat insulator plate 06, numeral 034 designates a hydraulic cylinder, numeral 034a designates a clevis mounted to the lower end portion of a piston rod of the same hydraulic cylinder 034, numeral 09 designates a bolster, numeral 09a designates a metal bracket fixedly secured to the same bolster 09, numeral 033 designates a pin for pivotably supporting the abovementioned clevis 034a on the metal bracket 09a, numeral 010' designates an upper heat insulating plate fixedly secured to the aforementioned bolster 09, numeral 010 designates an upper heater plate fixedly secured to the lower surface of the upper heat insulating plate 010', numeral 011 designates an upper mold fixedly secured to the lower surface of the upper heater plate 010, numeral 031 designates an upper ring, and numeral 031a designates a step portion formed at the top of the upper ring 031. The upper ring 031 is rotatably supported by the same step portion 031a being engaged with a step portion of the bolster 09. In addition, reference numeral 031b designates claws provided on the outer surface of the lower end portion of the upper ring 030, numeral 031c designates a pin provided on the upper surface of the upper ring 031, numeral 032 designates a hydraulic cylinder mounted to the frame, and numeral 032a designates a clevis mounted to a tip end portion of a piston rod of the aforementioned hydraulic cylinder 032. This clevis 032a is pivotally mounted to the aforementioned upper ring 031 via the pin 031c.

In the operation of the tire vulcanizing machine in the prior art which has the aforementioned construction, a green tire is set within the lower metal mold 07, then the bolster 09, the upper heat insulator plate 010', the upper heater plate 010, the upper metal mold 011 and the upper ring 031 are lowered to place the upper metal mold 011 on the lower metal mold 07 by extending the piston rod of the hydraulic cylinder 034. Subsequently, the piston rod of the hydraulic cylinder 032 is extended causing the upper ring 031 to rotate about its vertical axis due to the fact that the claws 031b provided on the outer surface of the lower end portion of the same upper ring 031 are engaged with the claws 030b provided on the inner surface of the upper end portion of the lower ring 031. Then, the piston rods of the hydraulic cylinders 03 are extended, the movement of the hydraulic cylinders 03 is transmitted to the upper metal mold 011 via the lower ring 030→the upper ring 031→the bolster 09→the upper heat insulator plate 010'→the upper heater plate 010. Thus, the upper metal mold 011 is lowered whereupon vulcanization of the green tire is carried out with the upper metal mold 011 kept in tight contact with the lower metal mold 07 under pressure. When the vulcanization has been finished, the piston rods of the hydraulic cylinders 03 are retracted thereby causing the lower ring 030 to release the engaged condition between the claws 030b provided on the inner surface of the upper end portion of the lower ring 030 and the claws 031b provided on the outer surface of the lower end portion of the upper ring 031. Subsequently, the piston rod of the hydraulic cylinder 032 is extended, whereby the upper ring 031 is rotated about its vertical axis in the direction opposite to that described above to disengage the claws 031b provided on the outer surface of the lower end portion of the upper ring 031 from the claws 030b provided on the inner surface of the upper end portion of the lower ring 030. Then, the piston rod of the hydraulic cylinder 034 is retracted to raise the bolster 09, the upper heat insulator plate 010', the upper heater plate 010, the upper metal mold 011 and the upper ring 031, whereby the upper metal mold 011 is separated from the lower metal mold 07. Subsequently, a vulcanized tire can be taken out from the inside of the lower metal mold 07.

What determines the quality of a tire vulcanized in the vulcanizing machine, is the preinflation (preliminary inflation called "shaping") of a green tire carried out when the upper metal mold 011 comes into tight contact with the lower metal mold 07. If a green tire is inflated too much, it may be possibly pinched between the upper metal mold 011 and the lower metal mold 07, while if the extent of inflation is too little, the green tire cannot be extended uniformly. Accordingly it is desirable to visually inspect the condition of the green tire up until just before the upper metal mold 011 and the lower metal mold 07 come into tight contact with each other. However, in the abovedescribed tire vulcanizing machine shown in FIG. 8, it is difficult to visually inspect the condition of a green tire because the upper ring 031 and the lower ring 030 are disposed outside of the upper metal mold 011 and the lower metal mold 07.

SUMMARY OF THE INVENTION

The present invention has been developed in view of the above-mentioned problems in the prior art, and one object of the present invention is to provide a novel tire vulcanizing machine in which the condition of a green tire can be visually inspected up until just before an upper metal mold and a lower metal mold come into tight contact with each other.

According to one embodiment of the present invention, there is provided a tire vulcanizing machine comprising: upper and lower bolsters disposed within a frame, upper and lower metal molds respectively fixedly secured to the upper and lower bolsters, press means, for bringing the lower metal mold into tight contact with the upper metal mold under pressure, disposed between the frame and the lower bolster, and pressing force hold means including a vertically movable polygonal pressure-receiving plate capable of assuming a short-sized rotational position in which the plate can vertically pass through a space between upper beams arranged in a nearly rectangular array as viewed in plan and a long-sized rotational position in which the plate cannot vertically pass through the same, rotary drive means for rotating the pressure-receiving plate about its center, and metal mold thickness adjust means provided between the pressure-receiving plate and the upper bolster for adjustably maintaining a clearance between the frame and the pressure-receiving plate.

According to another feature of the present invention, in the above-featured tire vulcanizing machine, the metal mold thickness adjust means comprises a vertically movable ring member disposed between the pressure-receiving plate and the upper bolster, and a spring interposed between the ring member and the pressure-receiving plate.

According to a second embodiment of the present invention, there is provided a tire vulcanizing machine comprising: upper and lower bolsters disposed within a frame, upper and lower metal molds respectively fixedly secured to the upper and lower bolsters, press means for bringing the upper metal mold into tight contact with the lower metal mold under pressure, a cylindrical body provided on the upper bolster and extending therefrom, an adjust screw threadedly engaged with the cylindrical body, a pressure-receiving plate having a polygonal shape coupled to the adjust screw via guide rods and capable of assuming a short-sized rotational position in which the plate can vertically pass through a space between upper beams arranged in a nearly rectangular array as viewed in plan and a large-sized rotational position in which the plate cannot vertically pass through the same space, the adjust screw capable of adjusting a clearance between the pressure-receiving plate and the upper beams, a hydraulic cylinder suspended from the pressure-receiving plate, and a motor for driving the adjust screw and rotating the pressure-receiving plate.

According to the present invention, owing to the above-described structural features, by actuating the rotary drive of the pressing force hold means, the pressure-receiving plate is rotated to the position in which it can pass through the space between the upper beams; subsequently the pressure-receiving plate, the upper bolster and the upper metal mold are raised and the upper metal mold is separated from the lower metal mold; and then a vulcanized tire is taken out from the inside of the lower metal mold. Subsequently, a new green tire is set in the lower metal mold; the pressure-receiving plate, the upper bolster and the upper metal mold are lowered to place the upper metal mold on the lower metal mold; and then, by actuating the rotary drive of the pressing force hold means, the pressure-receiving plate is rotated to the position where it cannot pass through the space between the upper beams. Next, the press means is actuated to raise the lower bolster and the lower metal mold, whereby the lower metal mold is brought into tight contact with the upper metal mold under pressure, whereupon vulcanization of the green tire is carried out. In addition, in the event that the thicknesses of the upper and lower metal molds have changed after replacement, or in a similar event, appropriate clearances can be maintained between the pressure-receiving plate and the frame and the like by the metal mold thickness adjust means.

Also, according to the present invention, owing to the structural features as described above in connection with the second preferred embodiment, once loading of a green tire has been completed, by actuating the pressing hydraulic cylinder of the press means, the cylinder main body is brought into tight contact with the adjust screw. On the other hand, the piston is brought into tight contact with the pressure-receiving plate, which is in turn brought into tight contact with the frame. Thereafter, the hydraulic cylinder is further actuated in the same manner to press the press means and the upper metal mold towards the lower metal mold, and the vulcanizing of the tire is begun. And, once the vulcanization of the tire has been finished, the hydraulic cylinder is actuated in a manner which gives rise to clearances between the frame and the pressure-receiving plate, between the pressure-receiving plate and the piston, and between the cylinder main body and the adjust screw. Subsequently, the motor is actuated, and its rotation is transmitted to the adjust screw and to the pressure-receiving plate. Thus, these elements are rotated by about 45° to bring the pressure-receiving plate into the position where the pressure-receiving plate can vertically pass through the space between the upper beams arranged in a nearly rectangular array as viewed in plan. Subsequently, the hydraulic cylinder is actuated to raise the abovementioned press means and the upper metal mold. Thus, the lower metal mold is opened, and a vulcanized tire can be taken out from the inside of the lower metal mold.

In addition, in the event that the thicknesses of the upper and lower metal molds have changed after replacement, or in a similar event, the clearances between the pressure-receiving plate and the frame and the like are adjusted to appropriate magnitudes by driving the motor to rotate the adjust screw.

According to the present invention, owing to the above-described structural features and operation of the tire vulcanizing machine, after a green tire has been loaded in the machine, the condition of the green tire can be confirmed by visual inspection up until just before the upper metal mold tightly contacts the lower metal mold, because there is no upper ring and lower ring provided outside of the upper and lower metal molds as in the tire vulcanizing machine in the prior art. Therefore, the loading of a green tire into the vulcanizing machine can be achieved reliably.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIG. 8 is a longitudinal cross-sectional view of a tire vulcanizing machine in the prior art.

DETAILED DESCRIPTION OF THE PREFERRED EMBODIMENTS

Figure 1:
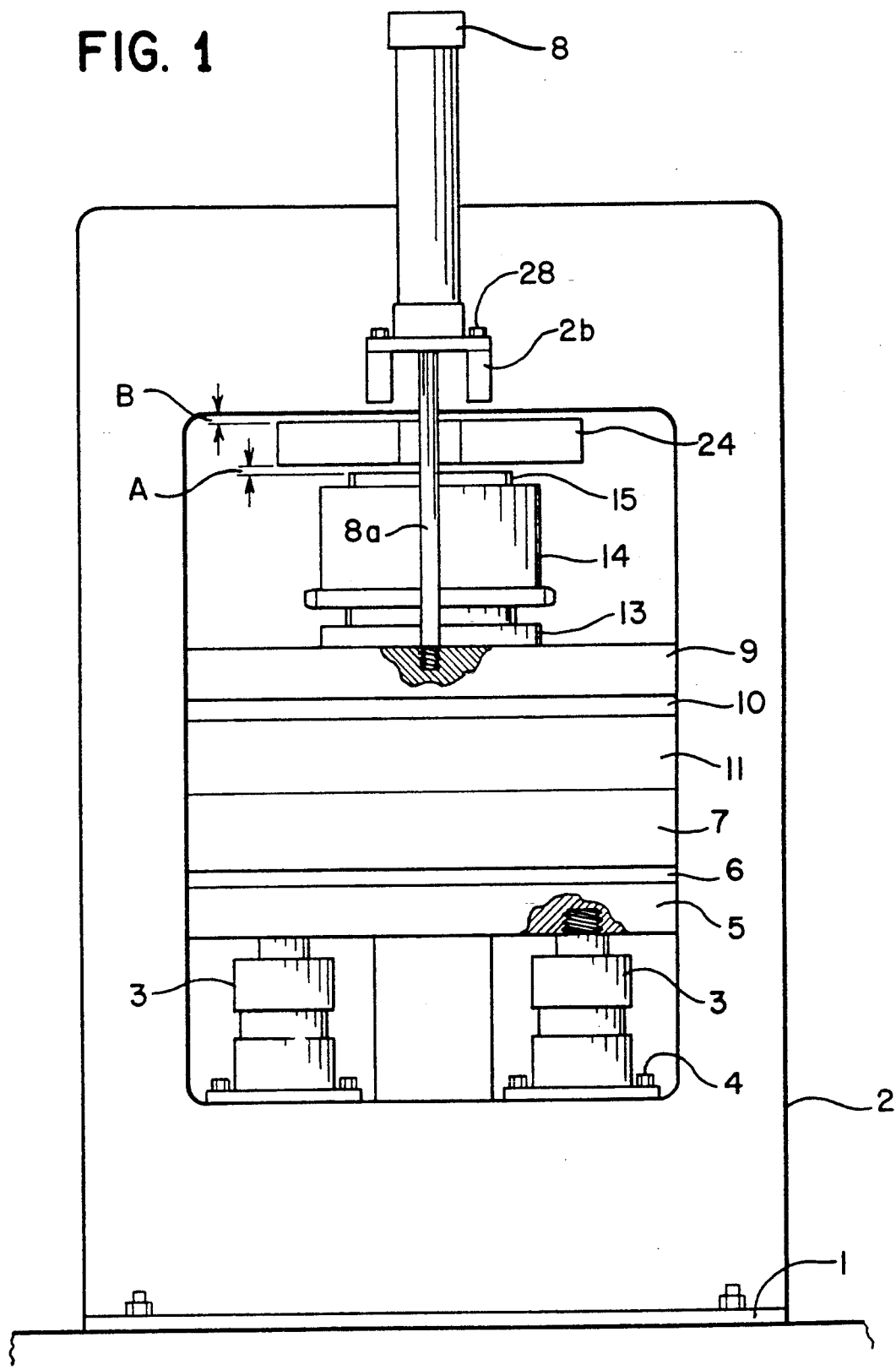
FIG. 1 is a front view of a first preferred embodiment of a tire vulcanizing machine according to the present invention.
Figure 2:
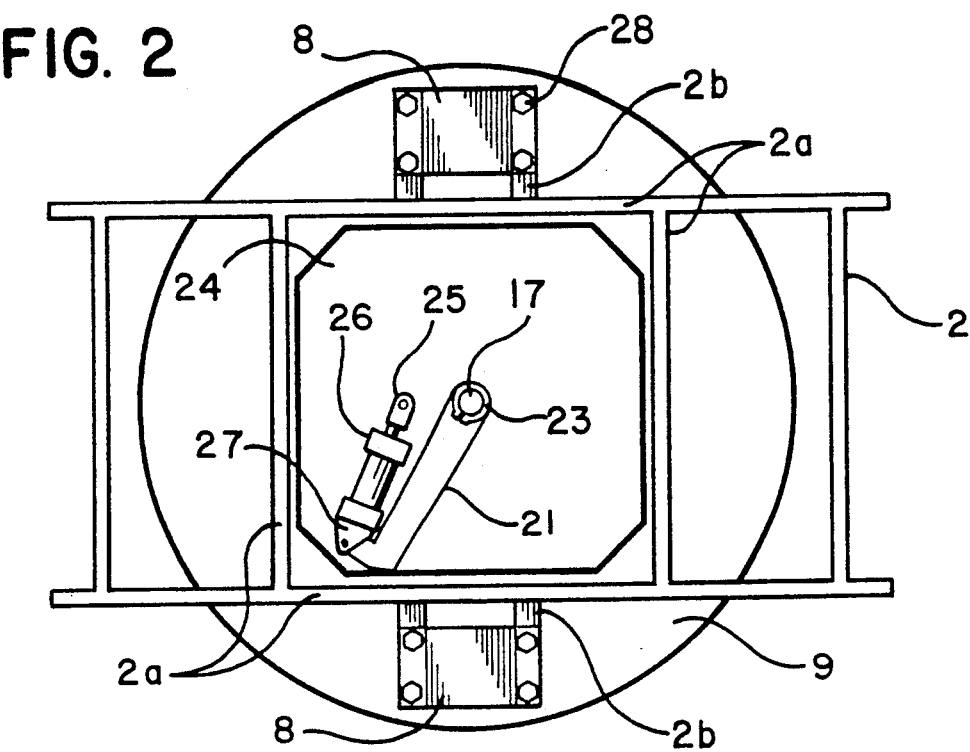
FIG. 2 is a plan view of the same showing a first rotational position of a pressure-receiving plate.
Figure 3:
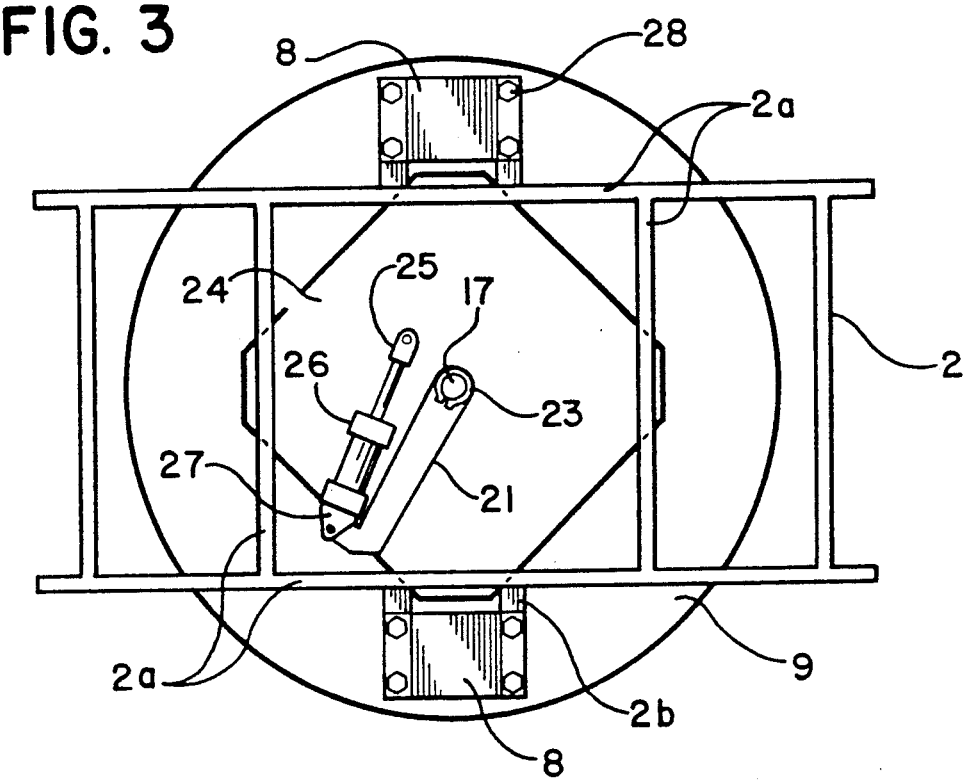
FIG. 3 is a plan view of the same showing a second rotational position of the pressure-receiving plate.
Figure 4:
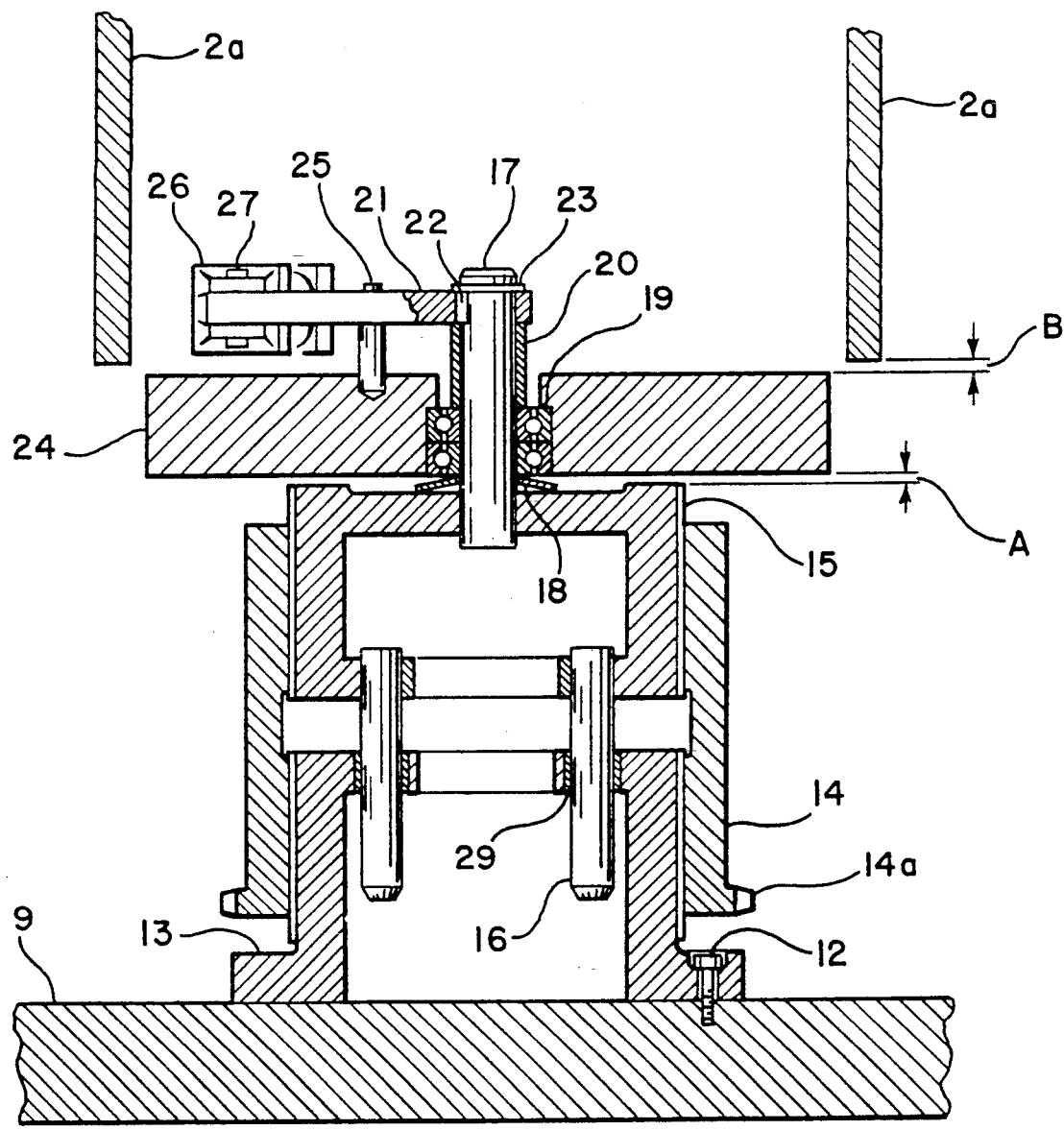
FIG. 4 is an enlarged longitudinal cross-sectional view of the pressure-receiving plate of the first preferred embodiment.

Now a first preferred embodiment of the present invention will be described with reference to FIGS. 1 to 4. In these figures, reference numeral 1 designates a base, numeral 2 designates a frame provided on the base 1 and extending therefrom, numeral 3 designates hydraulic cylinders, numeral 4 designates bolts for fixing the respective hydraulic cylinders 3 to the lower portion of the frame 2, numeral 5 designates a lower bolster fixedly secured to the upper end portions of the piston rods of the respective hydraulic cylinders 3, numeral 6 designates a lower heater plate fixedly secured to the upper surface of the lower bolster 5, and numeral 7 designates a lower metal mold fixedly secured to the upper surface of the lower heater plate 6. The lower bolster 5, lower heater plate 6 and lower metal mold are vertically movable with respect to the above-mentioned frame 2. In addition, reference numeral 9 designates an upper bolster, numeral 10 designates an upper heater plate fixedly secured to the lower surface of the upper bolster 9, numeral 11 designates an upper metal mold fixedly secured to the lower surface of the upper heater plate 10, numeral 2a designates upper beams arranged in the upper portion of the frame 2 in an array having a nearly rectangular shape as viewed in plan, numeral 2b designates cradles fixedly secured to the opposite side surfaces of the respective upper beams 2a, and numeral 8 designates hydraulic cylinders fixedly secured to the respective cradles 2b by means of bolts 28. The lower end portions of the piston rods 8a of the respective hydraulic cylinders 8 are threadedly connected to the above-mentioned upper bolster 9. Reference numeral 24 designates a pressure-receiving plate having a polygonal shape, and in the illustrated embodiment, the pressure-receiving plate 24 has an irregular octagonal shape formed by cutting away respective corner portions of a square plate. Therefore, when its longer sides are directed parallel to the upper beams 2a, it is in a short-sized condition and it can vertically pass through the space between the upper beams 2a as shown in FIG. 2. But, when it is rotated by 45°, it is in a long-sized condition and it cannot vertically pass through the space between the upper beams 2a as shown in FIG. 3. In addition, reference numeral 17 designates a rod extending through a vertical hole formed at the center of the pressure-receiving plate 24, numeral 19 designates two ball bearings interposed between the same rod 17 and the pressure-receiving plate 24, numeral 15 designates a right-hand screw ring fixedly secured to the lower end portion of the same rod 17, numeral 14 designates a female screw ring threadedly engaged with the aforementioned right-hand screw ring 15, numeral 14a designates a chain wheel provided on an outer circumferential surface of the lower portion of the same female screw ring 14, and numeral 13 designates a left-hand screw ring 14. The left-hand screw ring 13 is fixed on the above-described bolster 9 by means of bolts 12. In addition, reference numeral 16 designates a plurality of guide members fixedly secured to the aforementioned right-hand screw ring 15, and these guide members 16 extend through vertical holes formed in the upper portion of the above-described left-hand screw ring 13. Reference numeral 29 designates bushes interposed between the guide members 16 and the upper portion of the left-hand screw ring 13, and numeral 18 designates a belleville spring interposed between the pressure-receiving plate 24 and the right-hand screw ring 15. This belleville spring 18 exerts a force larger than the weight of the pressure-receiving plate 24, such that a clearance A is left between the pressure-receiving plate 24 and the right-hand screw ring 15 and a clearance B is left between the pressure-receiving plate 24 and the upper beams 2a. The degree of clearance can be adjusted by transmitting rotation of a drive source (not shown) to the chain wheel 14a of the female screw ring 14 via a chain (not shown) to rotate the female screw ring 14 and move the right-hand screw ring 15 vertically. In addition, reference numeral 20 designates a spacer fitted around the above-described rod 17, numeral 21 designates an arm, numeral 22 designates a key for fixing the arm 21 to the upper end portion of the aforementioned rod 17, numeral 23 designates a key retaining ring interposed between the head of the rod 17 and the above-mentioned arm 21, numeral 25 designates a pin provided on the pressure-receiving plate 24 and extending therefrom, and numeral 26 designate a hydraulic cylinder. A clevis of the piston rod of hydraulic cylinder 26 is pivotably supported by the aforementioned pin 25. Reference numeral 27 designates another pin for pivotably supporting the other end portion of the hydraulic cylinder 26 on the other end of the above-described arm 21.

Next, the operation of the tire vulcanizing machine illustrated in FIGS. 1 to 4 will be described in detail. A green tire is set in the lower metal mold 7, and when a clearance A is formed between the pressure-receiving plate 24 and the right-hand screw ring 15 and a clearance B is formed between the pressure-receiving plate 24 and the upper beams 2a, the piston rod of the hydraulic cylinder 26 is retracted. This movement is transmitted to the pressure-receiving plate 24 via the pin 25 and the pressure-receiving plate 24 is rotated about the rod 17 to the position shown in FIG. 21, that is, to the position where the pressure-receiving plate 24 can vertically pass through the space between the upper beams. Subsequently, the piston rods of the hydraulic cylinders 8 are retracted to raise the pressure-receiving plate 24, the right-hand screw ring 15, the female screw ring 14, the left-hand screw ring 13, the upper bolster 9, the upper heater plate 10 and the upper metal mold 11. Thus, the upper metal mold 11 is separated from the lower metal mold 7, and a vulcanized tire is taken out from the inside of the lower metal mold 7. Subsequently, a new green tire is set in the lower metal mold 7. Then, the piston rods of the hydraulic cylinders 8 are extended to lower the pressure-receiving plate 24, the right-hand screw ring 15, the female screw ring 14, the left-hand screw ring 13, the upper bolster 9, the upper heater plate 10 and the upper metal mold 11, whereby the upper metal mold 11 is placed on the lower metal mold 7. Next, the piston rod of the hydraulic cylinder 26 is extended. This movement is transmitted to the pressure-receiving plate 24 via the pin 25 to rotate the same pressure-receiving plate 24 about the rod 17 to the position shown in FIG. 3, that is, to the position where the pressure-receiving plate 24 cannot vertically pass through the space between the upper beams 2a. Subsequently, the piston rods of the hydraulic cylinders 3 are extended to raise the lower bolster 5, the lower heater plate 6 and the lower metal mold 7, whereupon the lower metal mold 7 is brought into tight contact with the upper metal mold 11 under pressure, and vulcanization of the green tire is carried out. In addition, in the event that the upper and lower metal molds 11 and 7 have been replaced or in a similar event, the female screw ring 14 can be rotated to vertically move the right-hand screw ring 15 and raise or lower the pressure-receiving plate 24 via the belleville spring 18, such that the clearance A between the pressure-receiving plate 24 and the right-hand screw ring 15 as well as the clearance B between the pressure-receiving plate 24 and the upper beams 2a can be adjusted to appropriate values.

Figure 5:
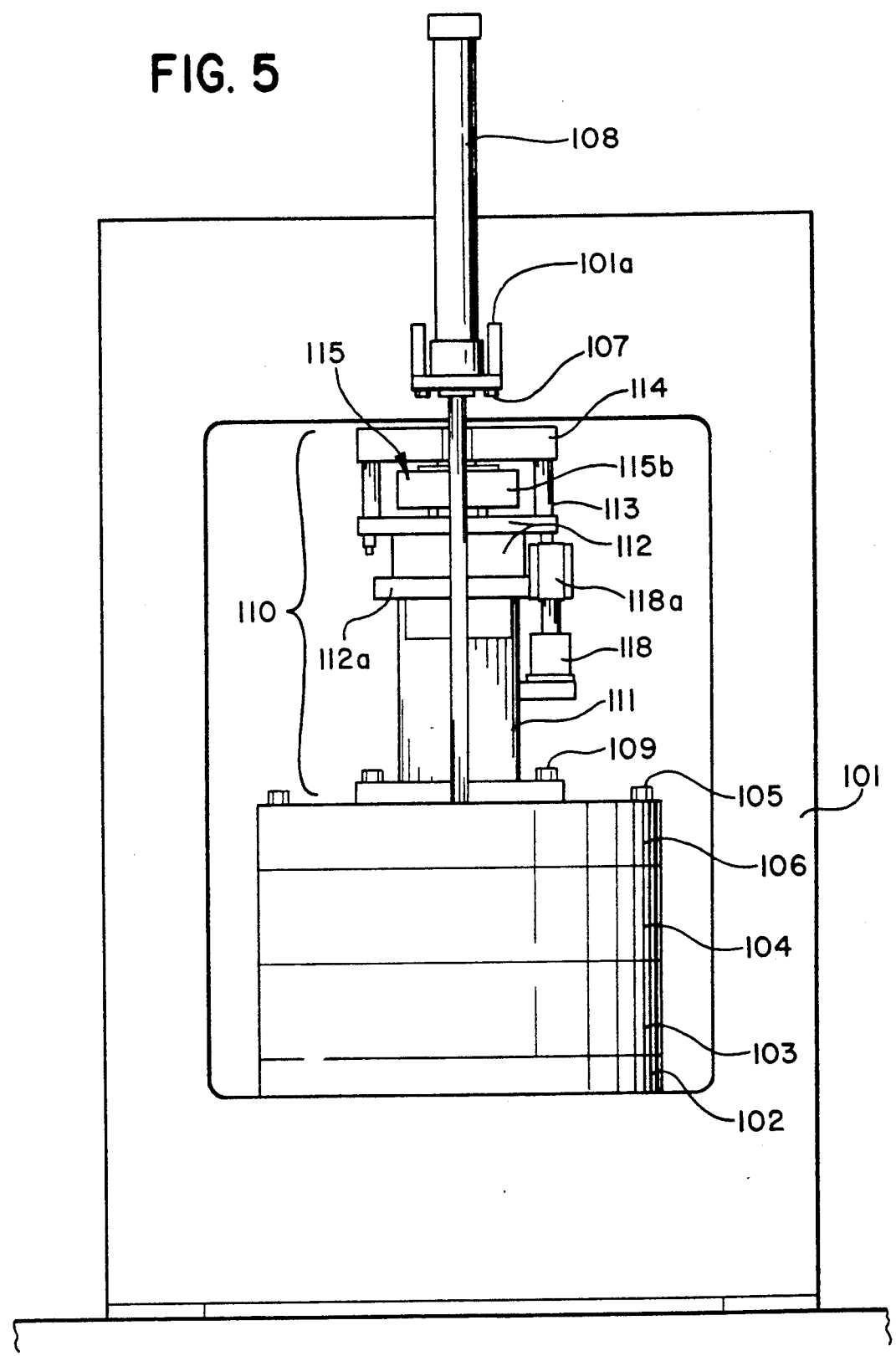
FIG. 5 is a front view of a second preferred embodiment of a tire vulcanizing machine according to the present invention.
Figure 6:
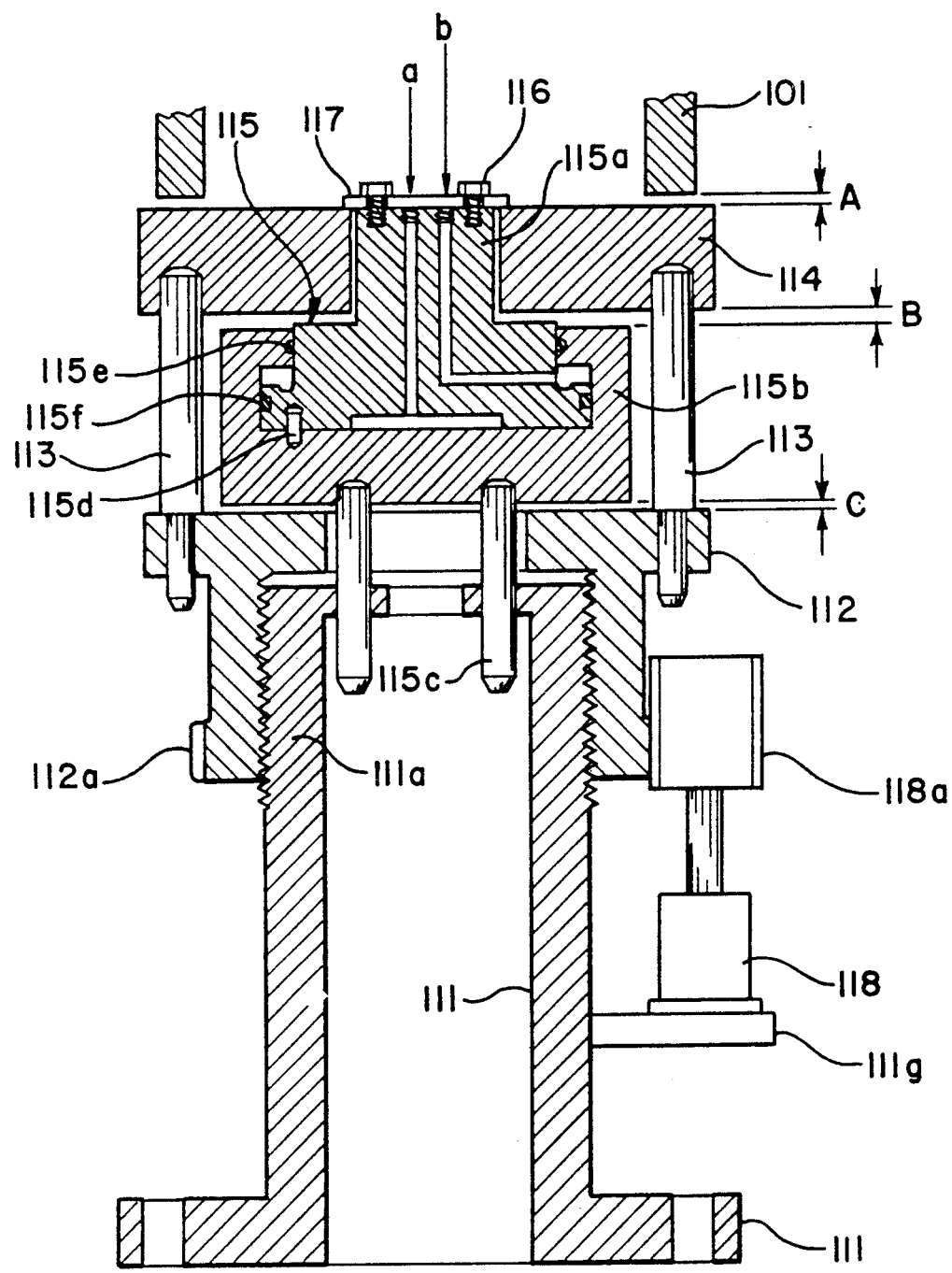
FIG. 6 is a longitudinal cross-sectional view of an essential part of the second preferred embodiment.
Figure 7:
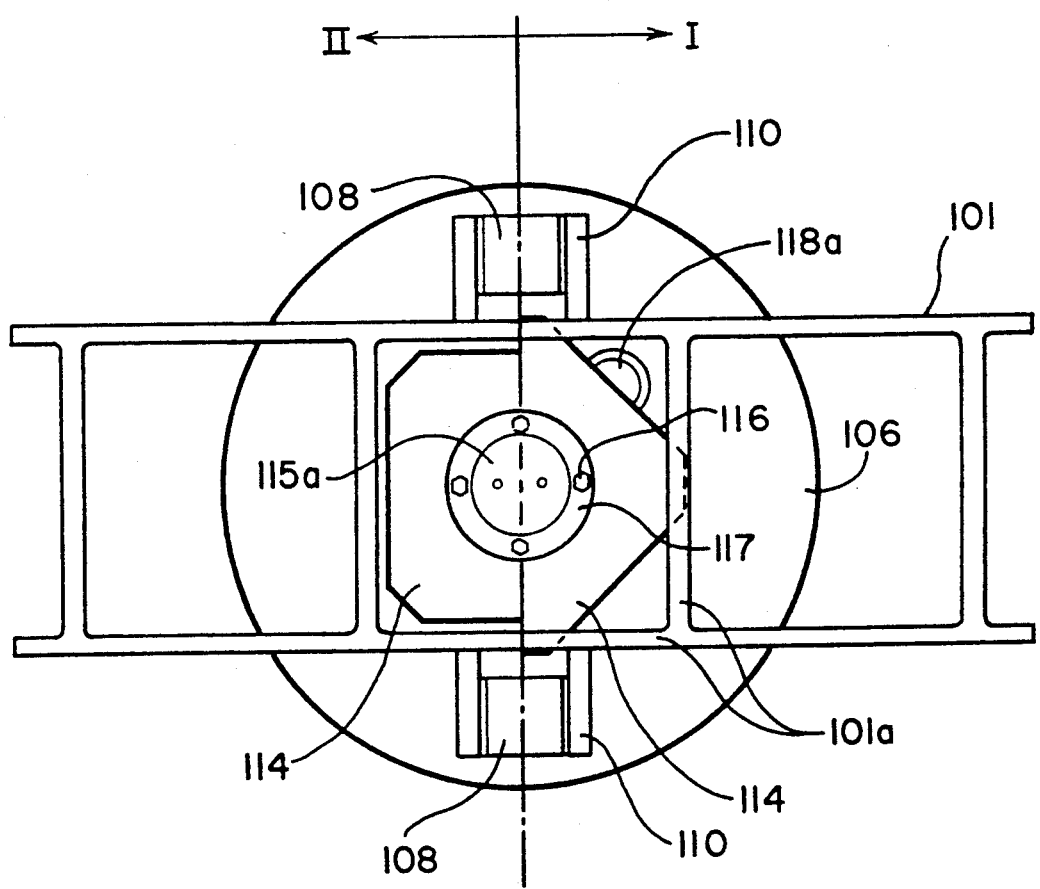
FIG. 7 is a plan view of the same.

Next, a second preferred embodiment of the present invention will be described with reference to FIGS. 5, 6 and 7. In these figures, reference numeral 101 designates a frame having upper beams 101a arranged in a nearly rectangular array as viewed in plan, numeral 102 designates a lower bolster (lower heater plate) mounted to the lower portion of the frame 101, numeral 103 designates a lower metal mold fixed on the lower bolster 102, numeral 108 designates hydraulic cylinders mounted to the upper beams 101a of the above-mentioned frame 101 via metal brackets 110, numeral 106 designates an upper bolster (upper heater plate) mounted to the lower end portions of the piston rods of the respective hydraulic cylinders 108, numeral 104 designates an upper metal mold fixedly secured to the upper bolster 106 via bolts 105, numeral 111 designates a cylindrical body provided on the upper surface of the aforementioned upper bolster 106 and extending therefrom, numeral 111a designates male screw threads provided on the outer circumference of the upper portion of the same cylindrical body 111, numeral 112 designates an adjust screw engaged with the aforementioned male screw threads 111a, numeral 114 designates a pressure-receiving plate positioned above the adjust screw 112, and numeral 113 designates a plurality of guide rods. The upper end portions of guide rods 113 are fixedly secured to the aforementioned pressure-receiving plate 114, and the lower end portions of the respective guide rods 113 are loosely fitted in vertical holes formed in the adjust screw 112. The pressure-receiving plate 114 has an irregular polygonal shape formed by cutting away the respective corner portions of a square plate, as shown in FIG. 7. When its longer sides are directe parallel to the upper beams 101a as shown in the left half 11 of FIG. 7, it is in a shortsized condition in which it can vertically pass through the space between the upper beams 101a, while when it is rotated by 45° as shown in the right half I of FIG. 7, it is in a long-sized condition in which it cannot vertically pass through the space between the upper beams 101a. In addition, reference numeral 115 designates a pressing hydraulic cylinder, and numeral 115a designates a piston of the same pressing hydraulic cylinder 115. Piston 115a is suspended from the pressure-receiving plate 114 by means of bolts 116 and a thrust plate 117, and a clearance B is formed between a surface of the piston 115a and the lower surface of the pressure-receiving plate 114. In addition, reference numeral 115b designates a cylinder body of the pressing hydraulic cylinder 115, and a clearance C is formed between the lower surface of the cylinder body 115b and the upper surface of the above-described adjust screw 112. Also, reference numeral 115c designates a plurality of whirl-stop rods. The upper end portions of the respective whirl-stop rods 115c are fixedly secured to the above-mentioned cylinder main body 115b, and the lower end portions of the respective whirl-stop rods 115c are loosely fitted in vertical holes formed in the cylindrical body 111. Also, reference numeral 115d designates a whirl-stop pin between the piston 115a and the cylinder main body 115b, numerals 115e and 115f designate packings interposed between the piston 115a and the cylinder body 115b, numeral 112a designates an annular gear provided on the outer circumference of the lower portion of the above-described adjust screw 112, numeral 111g designates a rack provided on the abovementioned cylindrical body 111, and numeral 118 designates a motor associated with reduction gears for rotationally driving the adjust screw, the motor 118 being mounted on the aforementioned rack 111g. In addition, reference numeral 118a designates a gear mounted to an output shaft of the same motor 118, and this gear 118a is meshed with the above-described annular gear 112a. Press means 110 comprises the cylindrical body 111 provided on the central portion of the upper bolster 106 and extending therefrom, the adjust screw 112 threadedly engaged with the threads 111a on the outer circumferential surface of the cylindrical body 111, the pressure-receiving plate 114 positioned above the adjust screw 112, the plurality of guide rods 113 fixedly secured to the pressure-receiving plate 114 and loosely fitted in the plurality of holes extending vertically through the adjust screw 112, the pressing hydraulic cylinder 115 fixedly secured to the lower surface of the pressure-receiving plate 114 and positioned just above the adjust screw 112, the whirl-stop rods 115c fixedly secured to the pressing hydraulic cylinder 115 and loosely fitted in the holes which extend vertically through the adjust screw 112 and the cylindrical body 111, and the adjust screw driving motor 118 mounted to the cylindrical body 111.

Now the operation of the tire vulcanizing machine illustrated in FIGS. 5, 6 and 7 will be explained in detail. Once loading of a green tire has been completed, pressurized air is fed through an air feed/exhaust system a into an upper press chamber of the pressing hydraulic cylinder 115, thereby lowering the cylinder body 115b by a distance corresponding to clearance C. The cylinder body 115b is brought into tight contact with the adjust screw 112. Also, the piston 115a is raised by a distance corresponding to clearance B to bring piston 115a into tight contact with the pressure-receiving plate 114, and at the same time piston 115a and pressure-receiving plate 114 are raised by a distance corresponding to clearance A to bring the pressure-receiving plate 114 into tight contact with the frame 101. Thereafter, the feeding of pressurized air is continued. After the above-mentioned clearances A, B and C have become zero, the pressing hydraulic cylinder 115 that is being actuated as described above, presses the adjust screw 112, the cylindrical body 111, the upper bolster 106 and the upper metal mold 104 towards the lower metal mold 103, and the vulcanizing step beings. Then, when a tire has been vulcanized, pressurized air is fed through an air feed/exhaust system b into a lower press chamber of the pressing hydraulic cylinder 115. At the same time, pressurized air in the upper press chamber of the pressing hydraulic cylinder 115 is exhausted through the air feed/exhaust system a to actuate the pressing hydraulic cylinder 115, whereby once again clearance A is formed between the frame 101 and the pressure-receiving plate 114, clearance B is formed between the pressure-receiving plate 114 and the piston 115a, and clearance C is formed between the cylinder main body 115b and the adjust screw 112. Subsequently, the motor 118 for rotationally driving the adjust screw is actuated. The rotation of motor 118 is transmitted via the gear 118a to the annular gear 112a and adjust screw 112, the guide rods 113 and the pressure-receiving plate 114, whereby these members 112-114 are rotated by about 45° from the condition shown in FIG. 7(I) to the condition shown in FIG. 7(II). Thus, the pressure-receiving plate 114 is brought into the condition where it can vertically pass through the space between the upper beams 101a arranged in a nearly rectangular array as viewed in plan. Next, the respective members 104, 106, 111 and 112-114 are raised by retracting the piston rods of hydraulic cylinders 108, whereupon the lower metal mold 103 is opened, and a vulcanized tire is taken out from the inside of the lower metal mold 103.

In addition, in the event that a total thickness of the upper and lower metal molds 103 and 104 has changed, the clearance A can be held at a constant value by actuating the motor 118 for rotationally driving the adjust screw.

As will be apparent from the detailed description of the preferred embodiments of the present invention, there is an advantage in that a green tire can be visually inspected until just before the upper metal mold comes into tight contact with the lower metal mold, owing to the structure which facilitates the following operation of the vulcanizing machine. That is, by actuating the rotary drive means the pressure-receiving plate is rotated to a first position in which it can pass through the space between the upper beams. Then the pressure-receiving plate, the upper bolster and the upper metal mold are raised to separate the upper metal mold from the lower metal mold. Thus, the vulcanized tire can be taken out from the inside of the lower metal mold. Subsequently a new green tire can be set in the lower metal mold, and the pressure-receiving plate, the upper bolster and the upper metal mold are lowered to place the upper metal mold on the lower metal mold. Next, by actuating the rotary drive means the pressure-receiving plate is rotated to a second position in which it cannot pass through the space between the upper beams. Then, by actuating the pressing means, the lower bolster and the lower metal mold are raised to bring the lower metal mold and the upper metal mold into tight contact under pressure, whereupon vulcanization of the green tire can be carried out. Therefore, the upper ring and the lower ring (the upper and lower rings surrounding the upper metal mold and the lower metal mold) in the heretofore known tire vulcanizing machine are unnecessary. In addition, in the event that the upper and lower metal molds have been replaced or in a similar event, the appropriate clearance between the pressure-receiving plate and the frame is maintained by a metal mold thickness adjust means, and so the loading and unloading of a tire into and from the tire vulcanizing machine and the vulcanization of a tire can be achieved reliably.

According to the second embodiment of the present invention, there is also the advantage in that a green tire can be visually inspected until just before the upper metal mold comes into tight contact with the lower metal mold, owing to the structure that facilitates the following operation of the vulcanizing machine. That is, once loading of a green tire has been completed, by actuating the pressing hydraulic cylinder, the cylinder body is brought into tight contact with the adjust screw, the piston is brought into tight contact with the pressure-receiving plate, and the pressure-receiving plate is brought into tight contact with the frame. Thereafter the pressing hydraulic cylinder is actuated to press the press means and the upper metal mold towards the lower metal mold, and the vulcanizing step begins. When the tire has been vulcanized, the pressing hydraulic cylinder is actuated such that gap clearances are once again formed respectively between the frame and the pressure-receiving plate, between the pressure-receiving plate and the piston and between the cylinder body and the adjust screw. Subsequently, the motor for rotationally driving the adjust screw is actuated. Rotation of the motor is transmitted to the adjust screw, the guide rods and the pressure-receiving plate. By rotating these members the pressure-receiving plate is brought to the position in which it may pass vertically through the space between the upper beams of the frame arranged in a nearly rectangular array as viewed in plan. Then the hydraulic cylinder for vertically moving the upper metal mold is actuated to raise the abovementioned press means and the upper metal mold. Thus the lower metal mold is opened, and the vulcanized tire can be taken out from the inside of the lower metal mold. Therefore, there is no need to provide the upper ring and the lower ring outside of the lower metal mold and the upper metal mold as is the case with the heretofore known prior art tire vulcanizing machine described in the beginning of this specification. In addition, in the event that the upper and lower metal molds have been replaced and their thicknesses have changed or in a similar event, by actuating the motor to rotate the adjust screw, the clearances between the pressure-receiving plate and the frame and other members can be adjusted to appropriate values, and so the loading and unloading of a tire into and from the tire vulcanizing machine, and the vulcanization of a tire can be achieved reliably.

While a principle of the present invention has been described above in connection with preferred embodiments of the invention, it is intended that all matter contained in the above description and illustrated in the accompanying drawings shall be interpreted to be illustrative of and not as a limitation on the scope of the invention.

What is claimed is:
1. A tire vulcanizing machine comprising:
a frame;
upper beams disposed at an upper portion of said frame and fixed thereto, said upper beams extending in a nearly rectangular array so as to define a space therebetween;
upper and lower bolsters disposed within said frame;
upper and lower molds respectively fixedly secured to said upper and said lower bolsters;
press means, disposed between said frame and said lower bolster, for pressing said lower mold into tight contact with said upper mold under pressure;
a pressure-receiving plate disposed above said upper bolster and supported in the machine so as to be vertically movable with said upper mold relative to said upper beams, said pressure-receiving plate having a polygonal shape and rotatable about a vertical axis between a first rotational position in which said place can be passed vertically through the space defined between said upper beams and a second rotational position in which said plate cannot be passed vertically through said space;

rotary drive means operatively connected to said pressure-receiving plate for rotating said plate about said axis between said first and second rotational positions thereof; and adjust means, interposed between said pressure-receiving plate and said upper bolster, for adjustably establishing and maintaining a vertical clearance between said pressure-receiving plate and said upper beams after said upper mold has been placed on said lower metal mold during a given operational step in the vulcanization of a tire by the machine such that said pressure-receiving plate can be rotated by said drive means without interfering with said upper beams.

2. A tire vulcanizing machine as claimed in claim 4, wherein said adjust means includes a ring-shaped member disposed between said pressure-receiving plate and said upper bolster and supported so as to be vertically movable relative to said upper bolster, and a spring interposed between said ring-shaped member and said pressure-receiving plate.

3. A tire vulcanizing machine comprising:

a frame;

upper beams disposed at an upper portion of said frame and fixed thereto, said upper beams extending in a nearly rectangular array so as to define a space therebetween;

upper and lower bolsters disposed within said frame;

upper and lower molds respectively fixedly secured to said upper and said lower bolsters;

press means, operatively disposed between said frame and said upper bolster, for pressing said upper mold into tight contact with said lower mold under pressure;

a cylindrical body mounted on said upper bolster and extending upwardly therefrom, said cylindrical body having a threaded portion;

an adjust screw threadingly engaged with said cylindrical body at the threaded portion thereof so as to be vertically movable relative to said cylindrical body when rotated;

a pressure-receiving plate disposed above said upper bolster, said pressure-receiving plate having a polygonal shape and rotatable about a vertical axis between a first rotational position in which said place can be passed vertically through the space defined between said upper beams and a second rotational position in which said plate cannot be passed vertically through said space;

guide rods coupling said pressure-receiving plate to said adjust screw in a manner in which said pressure-receiving plate is rotatably and vertically movable upon rotation of said adjust screw; and motor means operatively connected to said adjust screw for setting the position of said adjust screw relative to said cylindrical body in the machine to establish a vertical clearance between said pressure-receiving plate and said upper beams during a given operational step in the vulcanization of a tire by the machine, and for rotating said adjust screw to rotate said pressure-receiving plate between said first and said second rotational positions thereof.

* * * * *